United States Patent
Hirz et al.

(10) Patent No.: US 8,470,225 B2
(45) Date of Patent: Jun. 25, 2013

(54) TRAY OR STORAGE/TRANSPORT-BOX FLOOR

(75) Inventors: Dietheim Hirz, Neunkirchen (DE); Matthias Jung, Kreuztal (DE); Andreas Nieder, Neunkirchen (DE)

(73) Assignee: Fritz Schaefer GmbH, Neunkirchen (DE)

( * ) Notice: Subject to any disclaimer, the term of this patent is extended or adjusted under 35 U.S.C. 154(b) by 349 days.

(21) Appl. No.: 12/779,980

(22) Filed: May 14, 2010

(65) Prior Publication Data

US 2011/0005962 A1  Jan. 13, 2011

(30) Foreign Application Priority Data

May 15, 2009 (DE) .................. 10 2009 021 415

(51) Int. Cl.
*B29C 45/14* (2006.01)
(52) U.S. Cl.
USPC ............................. 264/250; 156/245; 156/293

(58) Field of Classification Search
USPC ........................... 264/250; 156/245, 292, 293
See application file for complete search history.

(56) References Cited

U.S. PATENT DOCUMENTS

| | | | | |
|---|---|---|---|---|
| 5,002,841 A | * | 3/1991 | Belongia et al. | 429/70 |
| 2008/0314913 A1 | * | 12/2008 | Apps | 220/628 |

FOREIGN PATENT DOCUMENTS

| | | |
|---|---|---|
| DE | 19627887 A | 1/1998 |
| EP | 0621190 B | 10/1994 |
| GB | 2255968 | * 11/1992 |

* cited by examiner

*Primary Examiner* — Jill Heitbrink
(74) *Attorney, Agent, or Firm* — Andrew Wilford

(57) ABSTRACT

A transport/storage tray is made by injecting molding of plastic an upper floor panel formed with an array of through-going holes and a separate lower floor panel with an array of throughgoing holes. Then the upper and lower panels are juxtaposed with each of the holes of the upper panel aligned with a respective one of the holes of the lower panel, and the two panels are welded together.

9 Claims, 9 Drawing Sheets

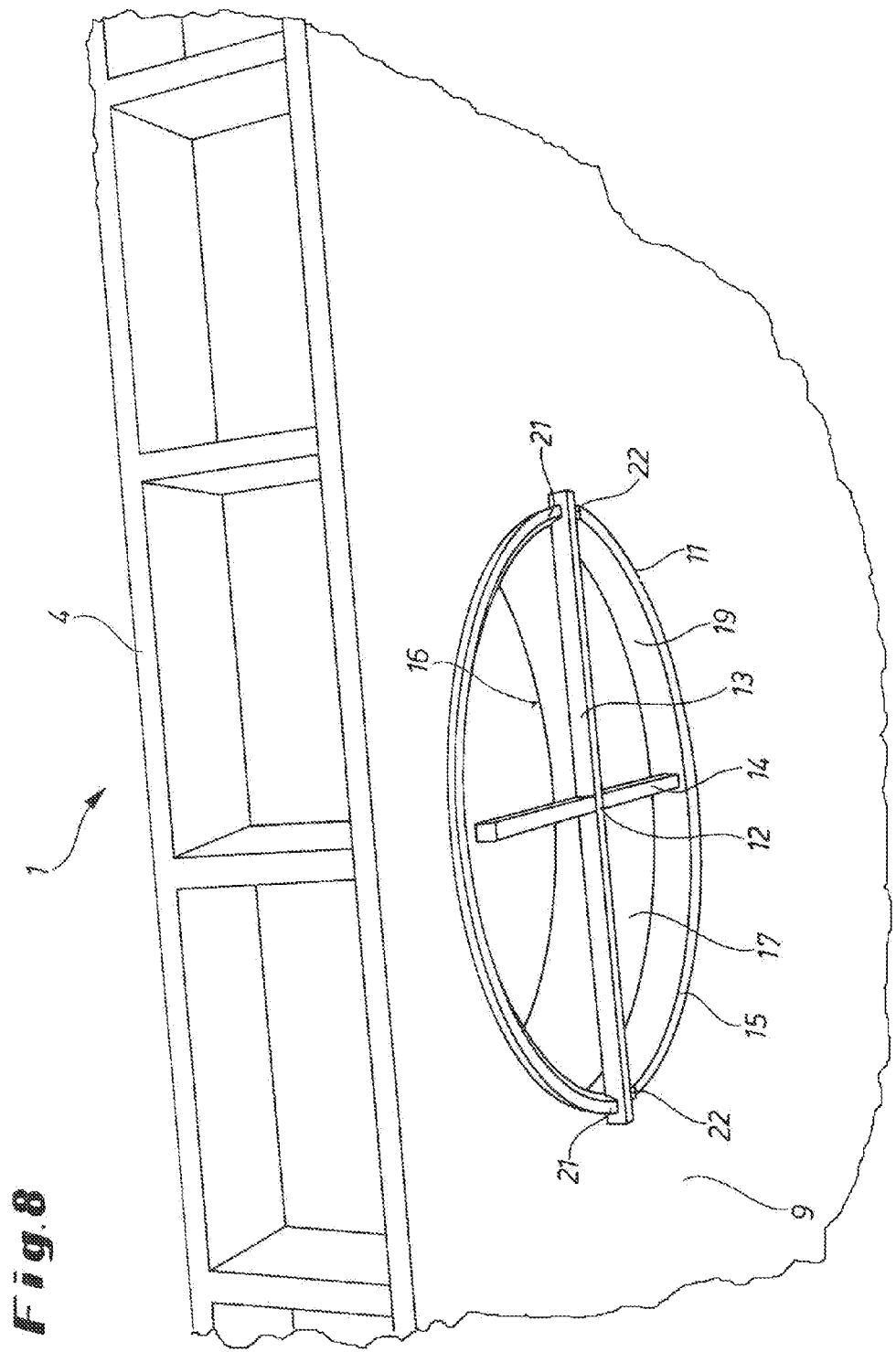

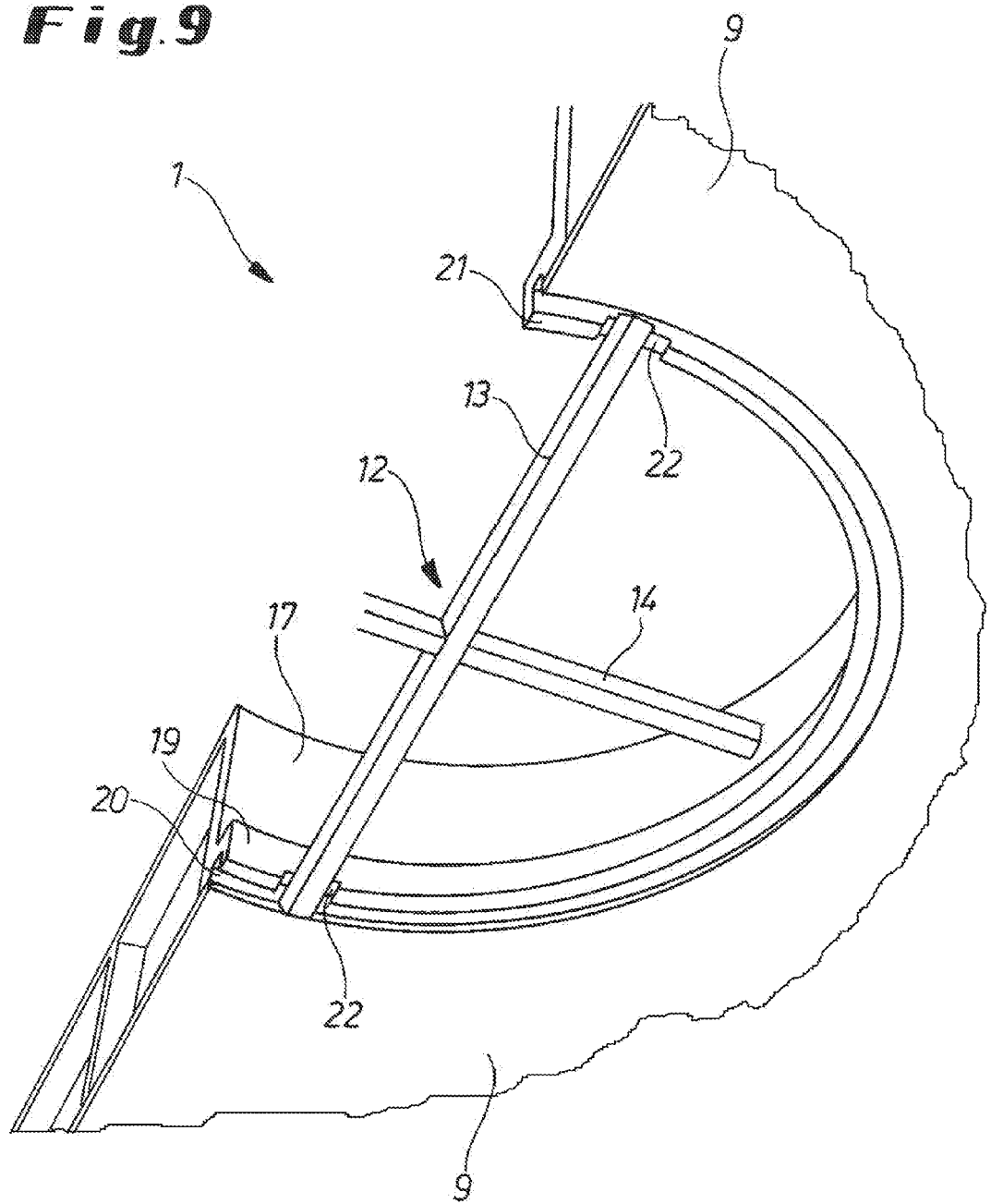

TRAY OR STORAGE/TRANSPORT-BOX FLOOR

FIELD OF THE INVENTION

The present invention relates to a tray or storage/transport box floor. More particularly this invention concerns a method of making such a tray or floor formed with an array of vertically throughgoing holes used to push up items stored on the tray or floor.

BACKGROUND OF THE INVENTION

A typical storage/transport box has a tray-like floor having outer edges from which extend vertical wall panels. For maximum rigidity, it is standard to make the floor of a pair of welded-together profiled panels made by injection molding. The floor is formed with an array of vertically throughgoing normally cylindrical holes that pass through both panels, that is that each has an upper part in the upper floor panel and a lower part in the lower floor panel.

An automated unloader has pushers that can move up through these holes to raise objects held in the box so they can be engaged by a rake-type grab and transported away. Such containers can be collapsible and formed as so-called pallet boxes, and are used both to transport objects and to store them on shelves.

Such a double-floor box is shown, for example in DE 196 27 887 and EP 0 621 190.

The floor of such a box, which in fact can be used all alone as a tray, is typically made by so-called vibration welding. To do this the lower panel is held and the upper panel is pressed down against it and vibrated. The friction at the interface between the panels melts the plastic and, when stopped, the panels fuse together at the fused film of plastic created where they contact each other. Once the fused film cools the two panels are drilled or milled to form the vertical holes through them, a wholly separate production step.

As a result holes have sharp edges are created both on the upper face of the floor and on the lower face at the outer periphery of the openings. In fact burrs are often formed that can, first of all, damage the load or the deposited items, and second, prevent the frictionless and smooth conveyance of the transport means on a conveyor belt or roll-type conveyor track.

In addition, when the openings are cut, plastic shavings are inevitably created that can both fall into the conveyor system and also be deposited on the load-bearing upper surface in the transport container. Removal of the plastic shavings is also in particular impeded by their static charge.

Subsequent machining of the cut openings by a further cutting and grinding procedure to round their edges requires an expensive additional operation, as a result of which the production process is lengthened to a not insignificant extent.

OBJECTS OF THE INVENTION

It is therefore an object of the present invention to provide an improved tray or storage/transport-box floor.

Another object is the provision of such an improved tray or storage/transport-box floor that overcomes the above-given disadvantages, in particular that makes manufacture of the transport container simple in that the subsequent formation of floor openings is no longer required.

SUMMARY OF THE INVENTION

A transport/storage tray is made according to the invention by injecting molding of plastic an upper floor panel formed with an array of throughgoing holes and a separate lower floor panel with an array of throughgoing holes. Then the upper and lower panels are juxtaposed with each of the holes of the upper panel aligned with a respective one of the holes of the lower panel, and the two panels are welded together.

Thus the openings are formed in the panels that make up the tray when they are injection molded, not machined in after the tray is assembled. The holes are therefore burr-free and form a smooth transition at the upper and lower planar faces of the tray around the peripheries of the openings. The containers or other objects in the finished transport/storage tray are thus not damaged, nor do they catch on uneven rims or edges of the openings. Due to the fact that the floor panel is free of interfering edges in the region of their openings, the transport/storage tray is able to slide across the conveyor equipment safely and largely free of vibration.

In an advantageous embodiment of the invention, provision is made whereby in order to weld the upper panel to the lower panel and a centering means is provided in at least one opening of the floor panel, preferably is directly molded on or alternatively is provided in the form of an insert that in aligned fashion engages a matching opening of the upper panel the two panels are fitted together, so as to relatively position the is two panels for the subsequent welding operation. The centering means thus do not have to be located in all openings in the hole pattern that is generally provided in two-tier form. It is sufficient if, in particular, one of the openings molded into one of the center openings of the floor panel has the centering means. The floor panel can be positioned precisely over this and secured in place by positive fit to the floor of the transport/storage tray. This can be facilitated further if the centering is effected by means of at least two openings.

In order to carry out the method, the invention provides an approach for a transport/storage tray whereby, to weld the upper panel to the lower panel, a circumferential groove is formed on a bottom inner part of outer collars delimiting the openings of one of the shells. A rectangular, ridge that projects horizontally inward is provided spaced upward from a bottom end of the outer collar and an inner collar extends downward from the free end of the ridge parallel to the outer collar, the collar protruding downward over the outer collar.

As a result, a circumferential, upwardly closed cavity or groove is formed between the outer collar and at the bottom on the inner collar of the openings. The inner collar extends further into each congruent opening of the lower panel to be welded, and terminates flush with the panel's lower surface, i.e., the bottom face.

The groove enables a welding bead created during welding to flow in and fill the groove. As a result, not only is the floor panel permanently welded to the transport/storage tray floor after the plastic material cools, but also the openings of the floor and the floor panel are joined to each other in a completely sealed fashion over their entire extent.

The extended inner collar of the openings furthermore functions to protect the welding bead formed and to delimit the welding bead, thereby preventing any plastic material from getting into the openings during the welding operation.

In a preferred embodiment of the invention, provision is made whereby the free bottom face of the inner collar of at least one opening is provided with opposing recesses or notches. After application of the floor panel to be welded, they are located within the complementary opening of the lower panel and receive a centering formation formed in the opening of the upper floor panel, which centering means is composed of two crossing struts having a strut engaging the recesses and extending over the entire diameter or cross-section of the opening. The strut that at the end of the opening snaps into the recesses and is thus relatively stiff facilitates precise positioning of the lower panel underneath the upper panel of the transport/storage tray.

The shorter strut that crosses the continuous strut at its center, preferably, at an angle of 90°, terminates a slight spacing from the inner periphery of the inner collar of the upper panel opening. The thus formed centering cross not only enables the upper panel to be centered and positively fitted on the lower panel of the transport and storage means, but also provides a zero-point centering for a tip of the welding tool that engages the opening and thereby receives the centering cross. The free, non-attached or non-affixed ends of the short strut here also provide a certain amount of freedom of motion in the vibrational direction of a vibration welding tool.

The floor panel welded to the transport/storage tray has according to the invention a planar and smooth contract surface—which property has the advantage that a smooth uninterrupted floor panel, on the one hand, withstands higher loads, and, on the other hand, runs or slides along conveyor tracks in a more frictionless and low-noise fashion than does a floor panel with ribbed contact surface or running surface that also would impede the drainage of washing water during cleaning.

In an advantageous embodiment of the invention, provision is made whereby the floor of the transport/storage tray is provided with transverse and longitudinal ribs on its bottom side facing the floor panel in those areas that do not have openings, thereby imparting a higher level of rigidity to the transport/storage tray when loaded.

Advantageously, both individual transverse ribs and longitudinal ribs are provided on their outer edges facing the lower panel with ventilation slots that allow air circulation in the closed subfloor, i.e. between the upper and lower panels. Water drainage holes are also advantageously provided to drain contaminated water and rain water from the upper surface of the is upper panel, which holes extend in respective collars between the upper panel and lower panel.

BRIEF DESCRIPTION OF THE DRAWING

The above and other objects, features, and advantages will become more readily apparent from the following description, reference being made to the accompanying drawing in which:

FIG. 8 is a large-scale perspective edge view of a detail of the structure of FIG. 6; and FIG. 9 is a large-scale bottom perspective view of the detail of FIG. 8.

SPECIFIC DESCRIPTION

Figure 1:
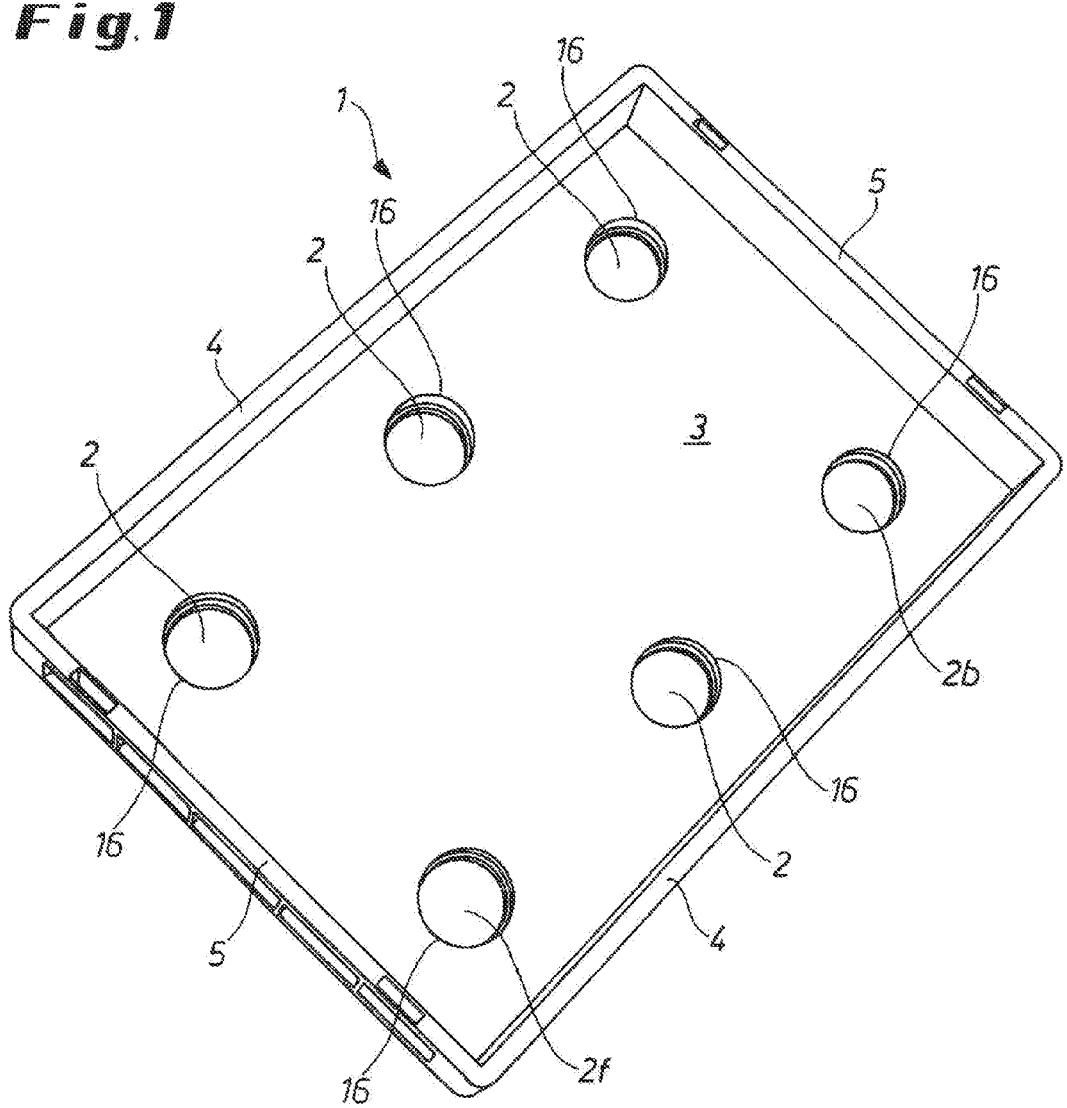
FIG. 1 is a perspective view from above of a top floor panel according to the invention.

As seen in FIG A tray 1 to be transported on a conveyor is system and deposited, for example, on a shelf has a substantially planar and rectangular floor panel 3 formed with vertically throughgoing circular holes or openings 2, longitudinal side walls 4, and transverse end walls 5 extending upward perpendicular to the upper panel 3. The openings 2 allow a lifting device to pass up through and raise items, not shown here, that are resting on the planar upper face of the upper panel 3. The panel; 3 is manufactured in one piece of plastic by injection molding, the openings 2 being formed directly in the injection mold to a smooth, burr- or edge-free, top and bottom edge to be obtained for these openings 2. Extensions may be added to the walls 4 and 5 to form a box.

Figure 2:
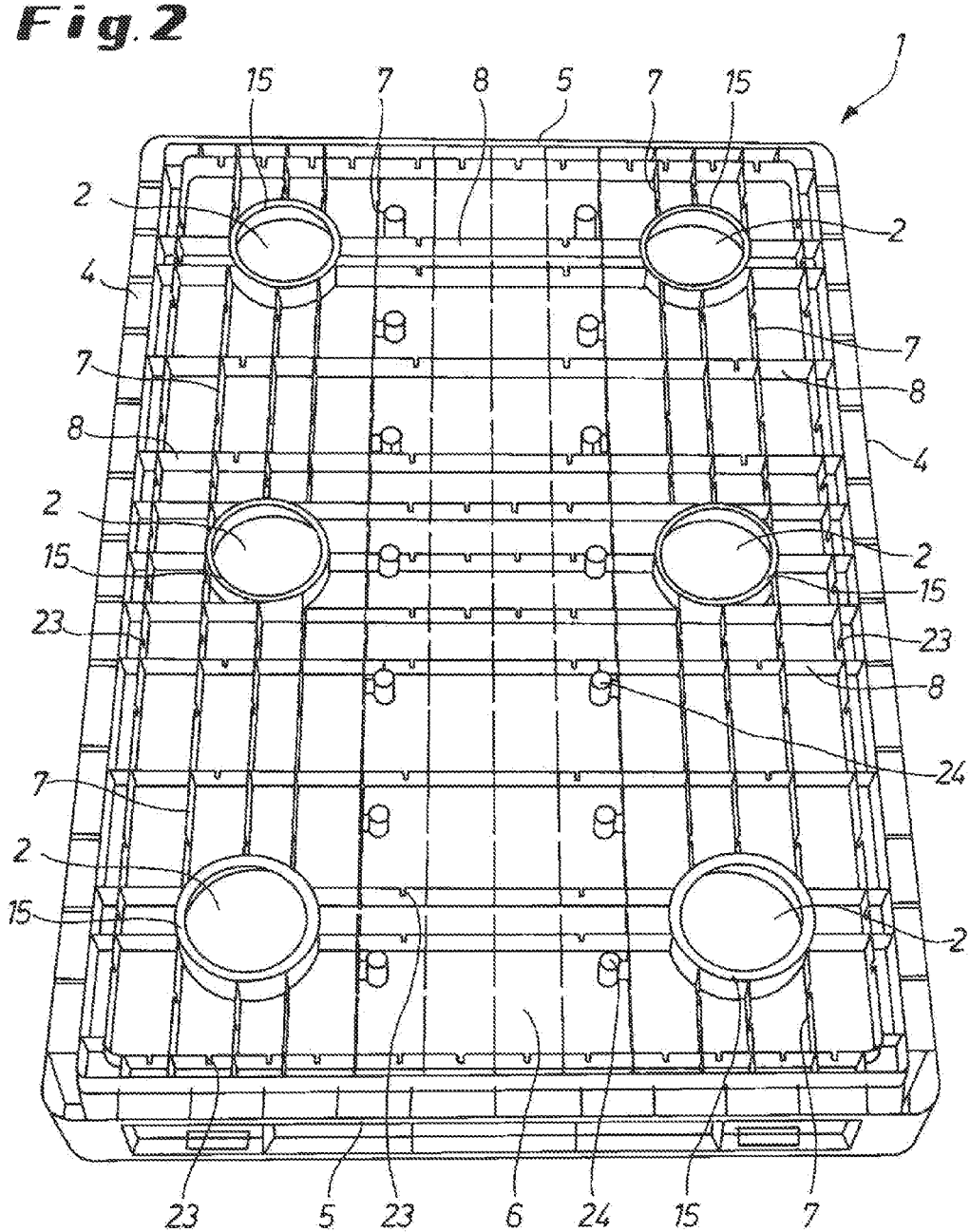
FIG. 2 is a perspective view from below of the top floor panel of FIG. 1.
Figure 5:
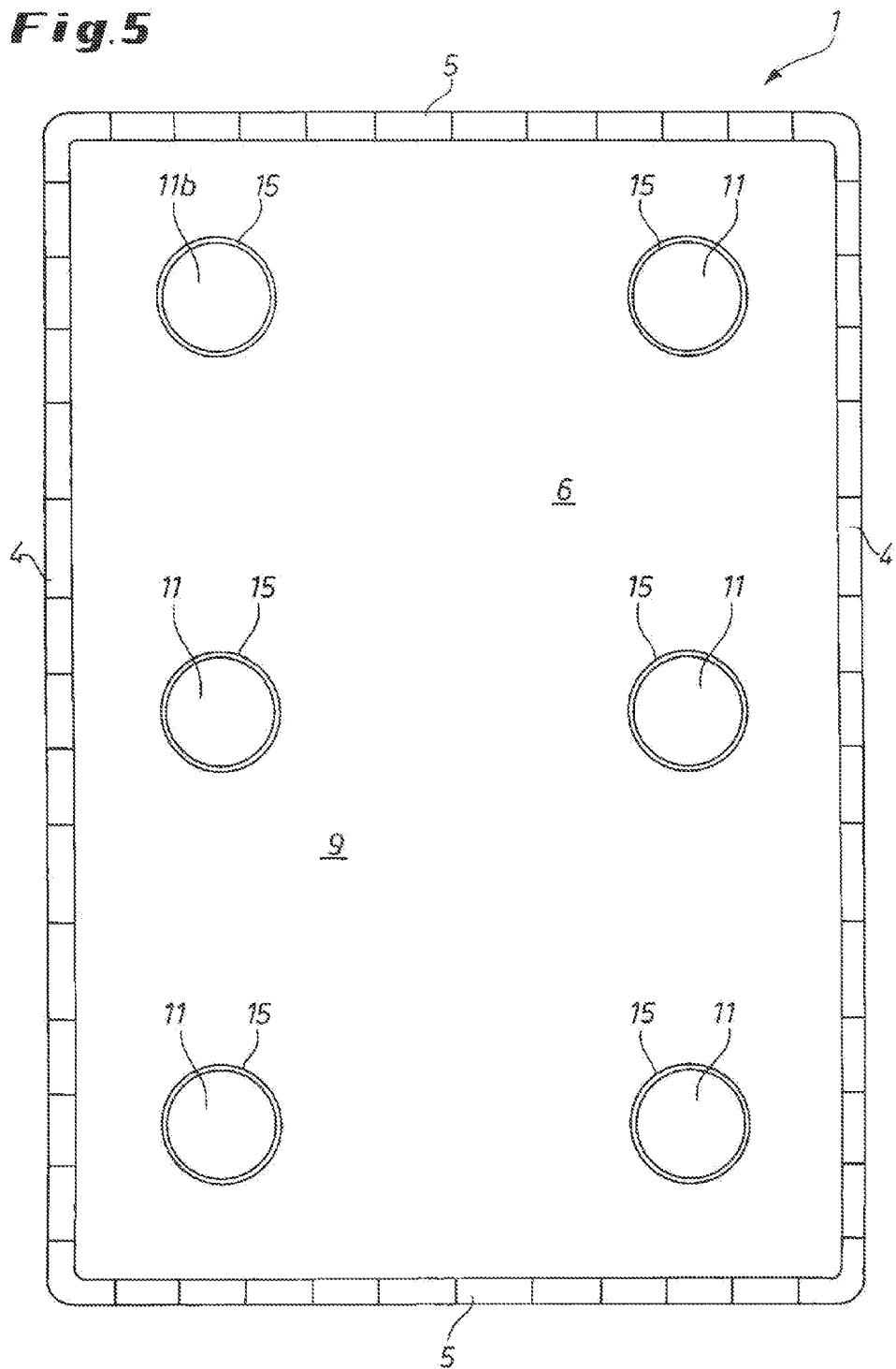
FIG. 5 is a bottom view of the assembled tray.
Figure 6:
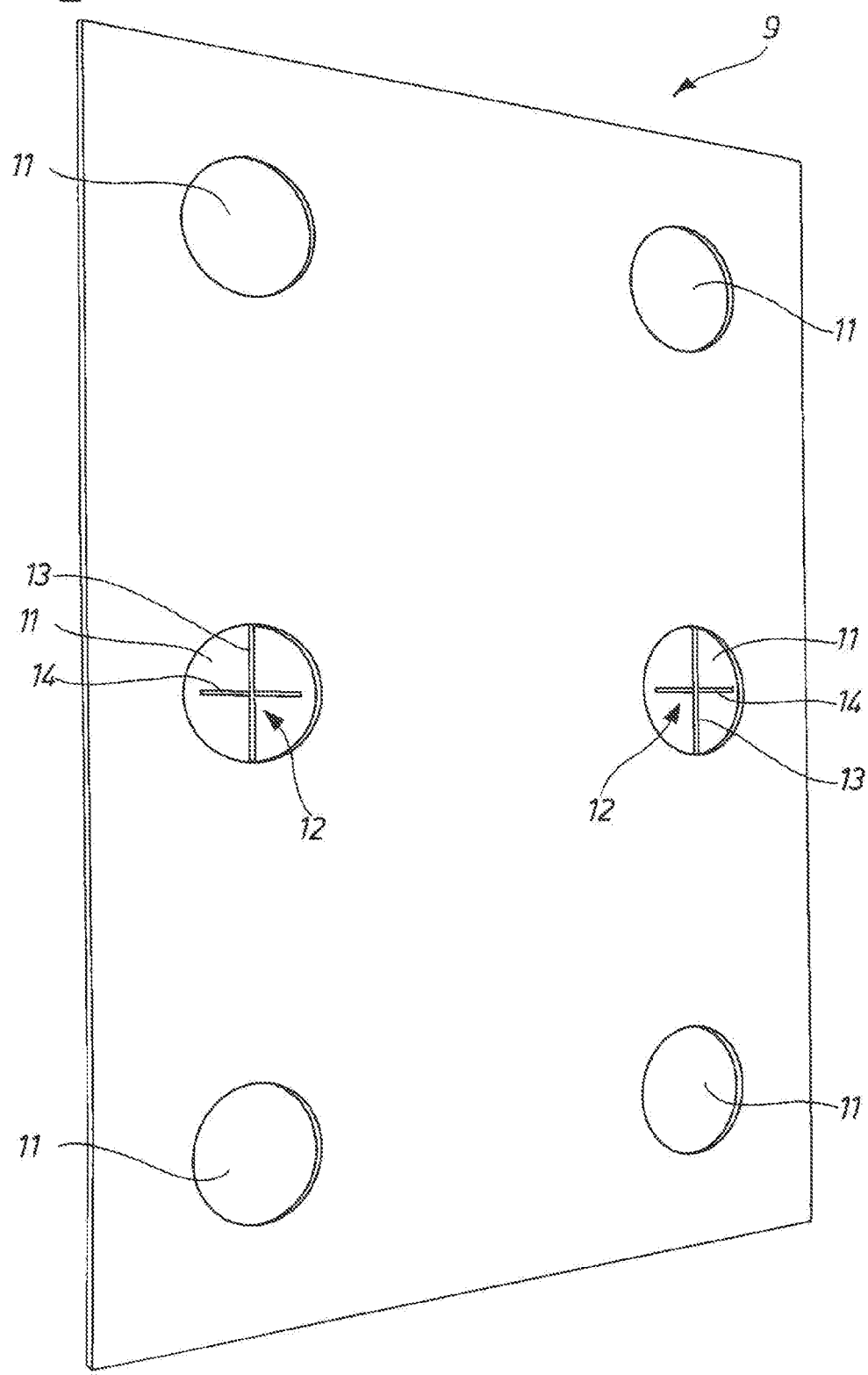
FIG. 6 is a bottom view of the lower panel.
Figure 7:
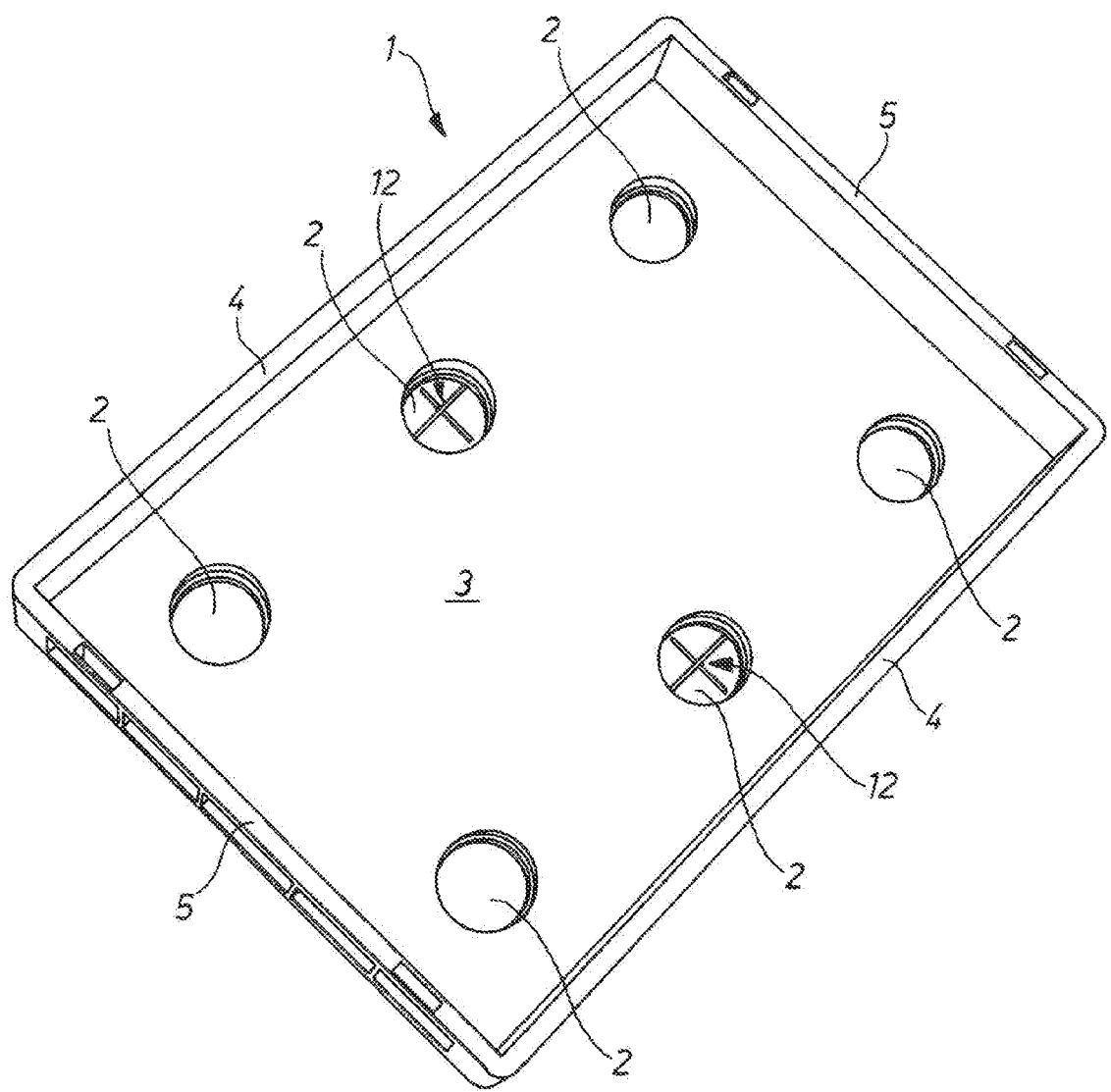
FIG. 7 is a top perspective view of the assembled tray with centering crosses installed.

As illustrated in FIG. 2, a bottom or lower face 6 of the upper panel 3 is formed by downwardly projecting longitudinal and transverse stiffening ribs 7 and 8 that reinforce the upper panel 3. This ribbed the upper panel 3 is welded at the face 6 to a separate floor panel 9 having planar upper and lower faces to form the tray 1. In order to improve the ability of floor panel 9 to run on conveyor systems, the panel has a smooth lower surface 10. When manufactured out of plastic by injection molding in the injection mold, the floor panel 9 is already formed with openings 11 (see FIGS. 5 and 6) that relatively oriented identically to the openings 2 of the upper floor panel 3. Thus when the panel 9 is fitted against the bottom of the panel 3, the openings 11 align perfectly with the openings 2 as shown in FIG. 5.

As shown in FIGS. 6 through 9, the two center openings 11 of the floor panel 9 are each provided with a centering cross 12 as centering means for the purpose of precisely centering the floor panel 9 on the bottom face bottom 6 of the upper panel 3 in preparation for welding the upper floor panel 3 to the lower floor panel 9. The centering cross 12 is composed of two center-crossing struts 13 and 14, of which strut 13 extends across the entire diameter or cross-section of the respective opening 11 and is permanently attached at its end to the floor panel 9 to secure in place the centering cross 12. At its ends, the shorter strut 14 is spaced from the inner periphery of the respective opening 11.

The generally cylindrical openings 2 of the upper floor panel 3 have a bottom end 15 of smaller diameter the respective top end 16. This reduction in diameter is created by an inwardly projecting rectangular-section and annular ridge 18 formed at the bottom end 15 of a cylindrical collar 17 otherwise forming of opening 2 and projecting downward somewhat past the ridge 18. An inner collar 19 project downward from an inner periphery of the ridge 19 to form a downwardly open and upwardly closed groove 20. When the lower floor panel 9 is welded to the upper floor panel 3, this groove 20 is at least partly filled with fused plastic to secure the two panels 3 and 9 together. The inner collar 19 fits into with the respective circular opening 11 of the panel 9, so that these openings 10 are of slightly smaller diameter than the openings 2, and the collars 19 serve to center the openings 11 on the respective openings 2. The inner collar 19 has a planar lower edge that normally is coplanar with a lower face of the lower panel 9 in the assembled tray 1 and that is formed with diametral notches 22 in which the ends of the longer strut 13 of the centering cross 12 fit.

The lower panel 9 can be centered relative to the upper panel in a horizontal plane by snapping the ends of the longer strut 13 into the recesses 22 so that it is fixed relative to the bottom face 6 of the tray panel 3 and to the tray's ribs 7 and 8. During the subsequent welding operation, an appropriately matched tip of the welding tool reaches through the openings 11 and thus detects the centering crosses 12 for a zero-point centering between the panel 3 and 9.

As a result of the heat developed during welding, first of all, a welding bead is formed that runs in circumferential groove 20, and secondly, a melt film is formed between floor panel 9 and bottom 6 of the upper panel 3. After the melted plastic material has cooled, the entire surface of floor panel 9 is permanently welded to tray 1. Inner collar 19, which protrudes into openings 11 and rests on these, prevents any expansion here of the welding bead into the interior of openings 2 and 11 that thus remain freely accessible, yet are to their complete extent or circumferentially joined to each other forming a seal. After the welding operation is completed, the centering crosses 12 are removed from the openings 11 and separated from the panel 9 by cutting the longer struts 13.

Figure 3:
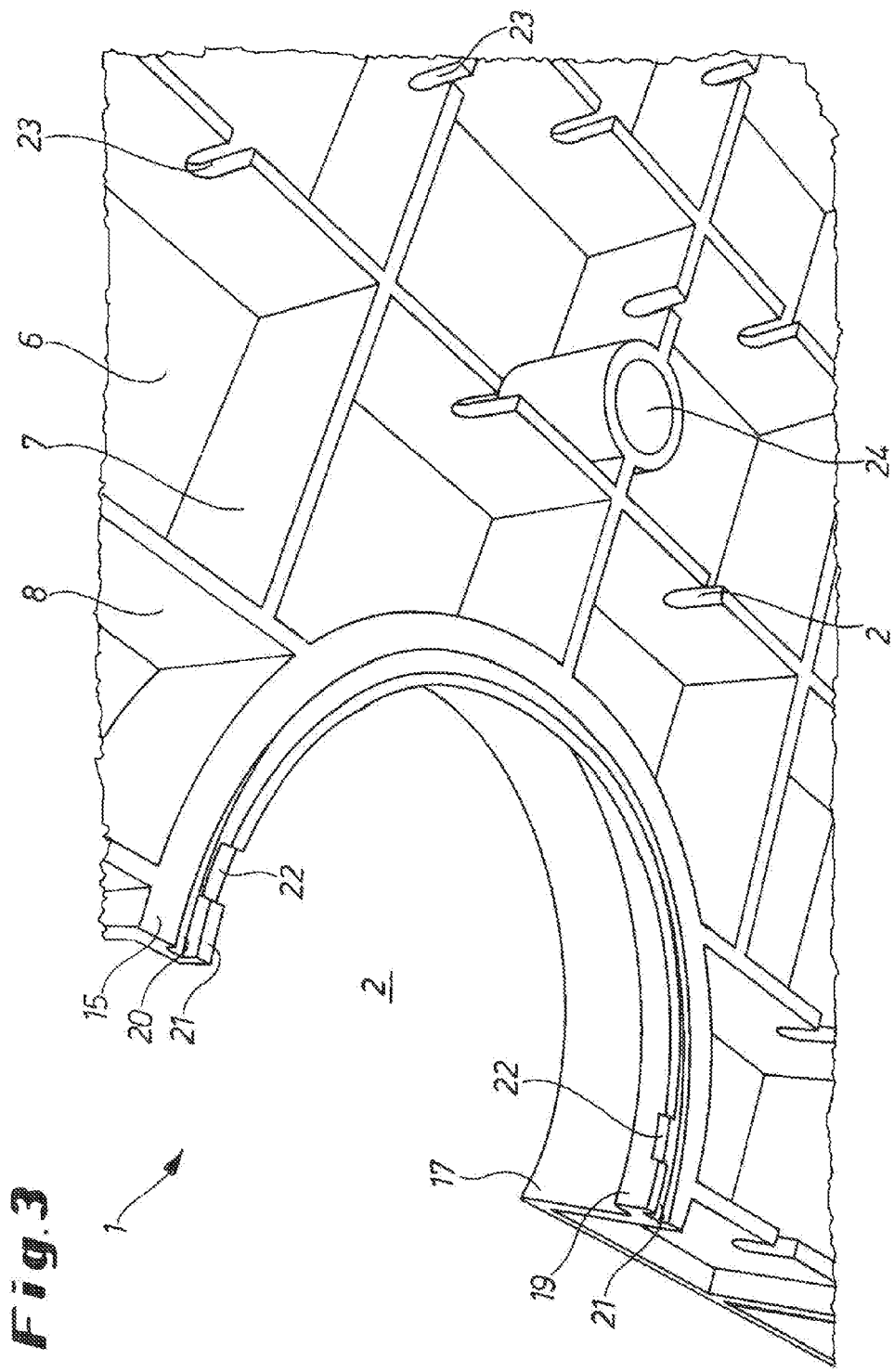
FIG. 3 is a large-scale partly broken-away perspective view of a detail of FIG. 2.
Figure 4:
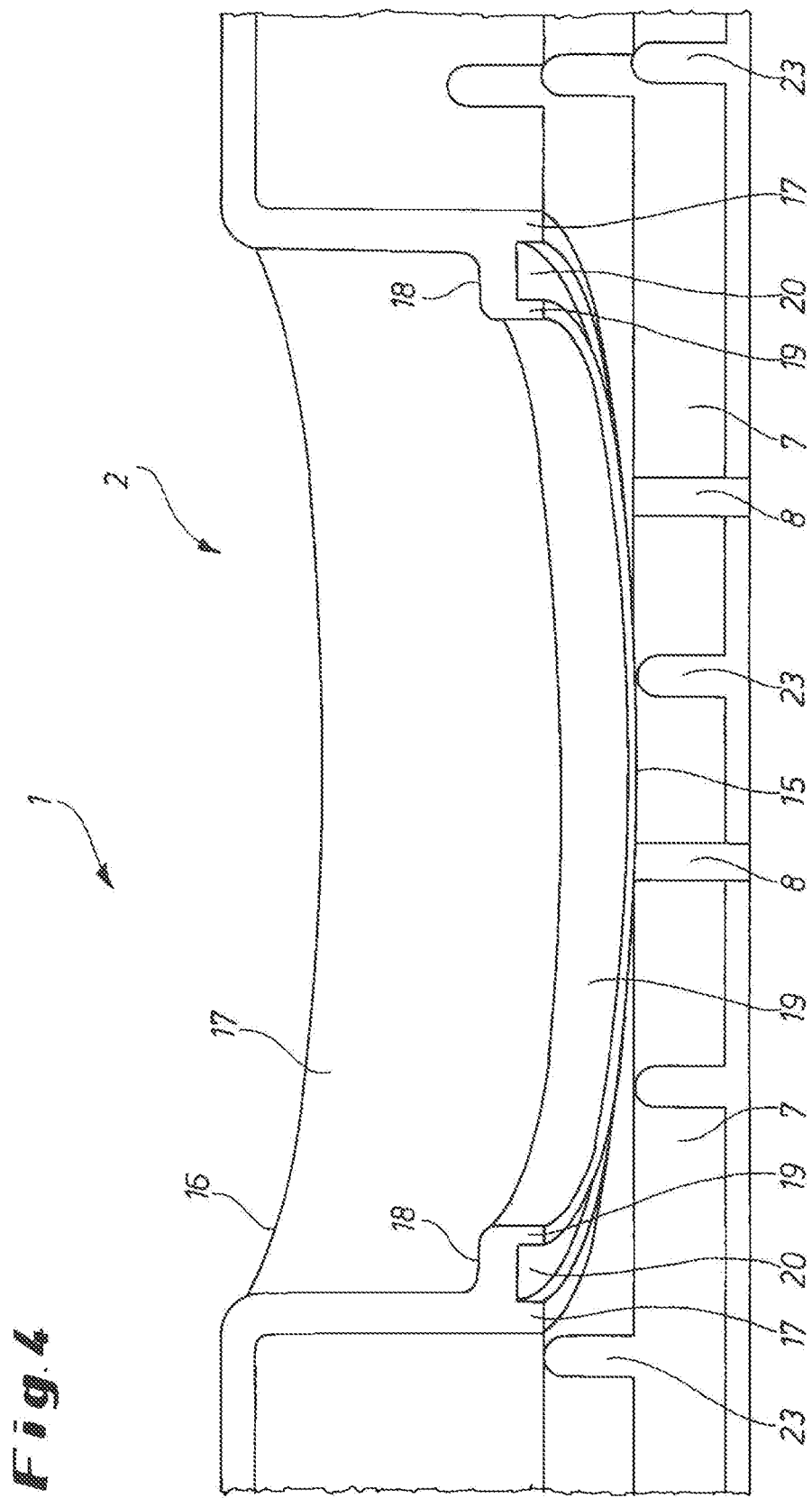
FIG. 4 is a large-scale sectional view of another detail of the upper panel.

In order to provide circulation of air between the panels 3 and 9, the longitudinal and transverse ribs 7 and 8 are formed with ventilation slots or notches 23 (see FIGS. 3 and 4).

In addition, the upper panel 3 of the tray 1 is provided with water drainage openings 24 (FIGS. 2 and 3 only) that are formed as tubular collars extending between the upper panel 3 and the floor panel 9.

We claim:

1. A method of making a tray comprising the steps of:
    injecting molding a plastic first floor panel formed with an array of throughgoing holes each defined by a collar projecting from the first panel;
    injection molding a second floor panel with an array of throughgoing holes substantially identical to the array of holes of the first panel;
    juxtaposing the first and second panels with each of the holes of the first panel aligned with a respective one of the holes of the second panel and each of the collars of the first panel engaging the second panel in direct alignment with a respective one of the holes of the second panel; and
    welding the two panels together.

2. The method defined in claim 1, further comprising the step of
    forming the lower panel with a smooth and substantially planar lower face.

3. The method defined in claim 1 further comprising the step of
    forming the upper panel with an array of downwardly projecting stiffening ribs defining a lower surface, the lower panel being welded to the ribs at the lower surface defined thereby.

4. The method defined in claim 3 further comprising the step of
    forming the ribs with transverse ventilation slots.

5. The method defined in claim 1, wherein each of the holes of the first panel is of the same size and shape as the respective hole of the second panel and each of the collars is of the same shape as the respective hole.

6. A method of making a tray comprising the steps of:
    injecting molding of plastic an upper floor panel formed with an array of throughgoing holes;
    injection molding a lower floor panel with an array of throughgoing holes;
    juxtaposing the upper and lower panels with each of the holes of the upper panel aligned with a respective one of the holes of the lower panel;
    welding the two panels together;
    forming the holes of one of the panels with collars fittable in the holes of the other of the panels; and
    fitting the collars of the one panel into the holes of the other panel when juxtaposing the panels.

7. The method defined in claim 6, further comprising the step of
    forming each of the collars with a lower end having an annular outer surface and an annular inner surface concentric therewith and separated therefrom by a downwardly open groove, the inner surface being below the outer surface such that the outer surface can sit atop the lower floor panel around the respective opening while the inner surface projects down and is generally flush with a lower face of the floor panel.

8. The method defined in claim 7, further comprising the step of
    forming each collar at its lower end with an inwardly projecting ridge and the inner surface is formed below an inner periphery of the ridge and the outer surface is formed around an outer periphery of the respective collar.

9. A method of making a tray comprising the steps of:
    injecting molding of plastic an upper floor panel formed with an array of throughgoing holes;
    injection molding a lower floor panel with an array of throughgoing holes;
    juxtaposing the upper and lower panels with each of the holes of the upper panel aligned with a respective one of the holes of the lower panel;
    welding the two panels together;
    forming at least one opening of one of the panels as a collar projecting toward the other panel and formed with diametrally opposite notches open away from the one panel;
    providing a removable centering cross in the opening of the lower panel; and
    using the centering cross for positioning a welding tool.

* * * * *